(12) United States Patent
Sweeney et al.

(10) Patent No.: US 7,099,579 B2
(45) Date of Patent: Aug. 29, 2006

(54) BRIDGE TERMINAL OUTPUT UNIT

(75) Inventors: Brian Sweeney, Woodbridge, VA (US); Charles West, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 275 days.

(21) Appl. No.: 10/180,333

(22) Filed: Jun. 27, 2002

(65) Prior Publication Data

US 2004/0208568 A1    Oct. 21, 2004

(51) Int. Cl.
*H04J 14/00*  (2006.01)
(52) U.S. Cl. .......................................................... 398/7
(58) Field of Classification Search ................ 398/2–5, 398/1, 7; 370/258, 222–224
See application file for complete search history.

(56) References Cited

U.S. PATENT DOCUMENTS

| | | | | |
|---|---|---|---|---|
| 5,577,196 | A * | 11/1996 | Peer ............................... | 714/4 |
| 6,049,571 | A * | 4/2000 | Hasegawa et al. ........... | 375/292 |
| 6,122,082 | A * | 9/2000 | Fishman ........................ | 398/1 |
| 6,226,111 | B1 * | 5/2001 | Chang et al. .................. | 398/9 |
| 6,956,988 | B1 * | 10/2005 | Amin et al. .................... | 385/24 |
| 2002/0021464 | A1 * | 2/2002 | Way ............................. | 359/124 |
| 2002/0131115 | A1 * | 9/2002 | Kasahara ..................... | 359/124 |
| 2003/0025956 | A1 * | 2/2003 | Li et al. ....................... | 359/110 |

OTHER PUBLICATIONS

D. Cavendish, "Evolution of Optical Transport Technologies: From SONET/SDH to WDM", IEEE Communications Magazine, Jun. 2000.*

* cited by examiner

*Primary Examiner*—Shi K. Li
(74) *Attorney, Agent, or Firm*—John J. Karasek; Thomas D. Robbins

(57) ABSTRACT

The commercial demand for higher aggregate data rates has led to DWDM (Dense Wavelength Division Multiplexed) transmissions. Network elements need the capacity in these systems to reconfigure in case of a bit stream failure. The instant invention can bridge communications between other network elements including optical and electrical signal network elements, when a loss of signal detection circuit to substitute a second bit stream for a time delayed original bit stream and a circuit element connected to the loss of signal detection circuit to permit the network elements to reconfigure without activating automatic protect switch mechanisms of a bridged network. The instant invention also teaches a method for ensuring communication of network elements of a bridged network including optical and electrical signal network elements, by detecting a loss of signal in a transmitted bit stream; substituting a second bit stream for a time delayed original bit stream; and allowing network elements to crossconnect to reconfigure optical channels in a manner that will not interfere with network functions.

1 Claim, 4 Drawing Sheets

Example 1. Short Loss
Original OC-3 SONET/ STM-1 SDH Signal. Loss of signal event is shorter than a SONET/SDH frame.

```
Time (uS)| Frame | Data ( 2,430 bytes per frame, abbreviated)              | Comments
       0 |     1 | F6F6F6282828010203893BD6...(2,418 more bytes in frame)  | Normal Data Flow
     125 |     2 | F6F6F6282828010203981234...(2,418 more bytes in frame)  |
     250 |     3 | F6F6F62828280102039BD345...(2,418 more bytes in frame)  |
     375 |     4 | F6F6F6282828010203A7D378...(2,418 more bytes in frame)  |
     500 |     5 | F6F6F6282828010203128745...(2,418 more bytes in frame)  |
     625 |     6 | F6F6F6282828010203E45289...(2,418 more bytes in frame)  |
     750 |     7 | F6F6F6282828010203B45689...(2,418 more bytes in frame)  |
     875 |     8 | F6F6F6282828010203662390...(2,418 more bytes in frame)  |
    1000 |     9 | F6F6F6282828010203C689B2...(2,418 more bytes in frame)  |
    1125 |    10 | F6F6F6282828010203A90128...(2,418 more bytes in frame)  |
    1250 |    11 | F6F6F6282828010203a89800000000000000...(> 1550 0's )    | Loss-of-signal Event
    1375 |    12 | F6F6F62828280102037692D8...(2,418 more bytes in frame)  | Signal Restored
    1500 |    13 | F6F6F6282828010203DFE4BA...(2,418 more bytes in frame)  |
    1675 |    14 | F6F6F62828280102034SAC18...(2,418 more bytes in frame)  |
```

FIG. 3a

Output OC-3 SONET/ STM-1 SDH Signal using The Disclosed Invention in which a substitute
Bit-stream with SONET/SDH framing is placed on the output line.

```
Time (uS)| Frame | Data ( 2,430 bytes per frame, abbreviated)                      | Comments
       0 |     1 | F6F6F6282828010203893BD6...(2,418 more bytes in frame)          | Normal Data Flow
     125 |     2 | F6F6F6282828010203981234...(2,418 more bytes in frame)          |
     250 |     3 | F6F6F62828280102039BD345...(2,418 more bytes in frame)          |
     375 |     4 | F6F6F6282828010203A7D378...(2,418 more bytes in frame)          |
     500 |     5 | F6F6F6282828010203128745...(2,418 more bytes in frame)          |
     625 |     6 | F6F6F6282828010203E45289...(2,418 more bytes in frame)          |
     750 |     7 | F6F6F6282828010203B45689...(2,418 more bytes in frame)          |
     875 |     8 | F6F6F6282828010203662390...(2,418 more bytes in frame)          |
    1000 |     9 | F6F6F6282828010203C689B2...(2,418 more bytes in frame)          |
    1125 |    10 | F6F6F6282828010203A90128...(2,418 more bytes in frame)          |
    1250 |    11 | F6F6F6282828010203a89899999F6F6F62828280102039999....           | LOS Selected Bit-stream
    1375 |    12 | F6F6F62828280102037692D8...(2,418 more bytes in frame)          | LOS Dropped, original
    1500 |    13 | F6F6F6282828010203DFE4BA...(2,418 more bytes in frame)          | Signal is Restored
    1675 |    14 | F6F6F62828280102034SAC18...(2,418 more bytes in frame)          |
```

FIG. 3b

```
Example 2. Long Signal Loss.
Original OC-3 SONET/ STM-1 SDH Signal. Loss of signal event is longer than a SONET/SDH frame.
Time (uS)| Frame | Data ( 2,430 bytes per frame, abbreviated)                    | Comments
    0    |   1   | F6F6F6282828010203893BD6...(2,418 more bytes in frame)        | Normal Data Flow
   125   |   2   | F6F6F6282828010203981234...(2,418 more bytes in frame)        |
   250   |   3   | F6F6F6282828010203991345...(2,418 more bytes in frame)        |
   375   |   4   | F6F6F6282828010203A7D378...(2,418 more bytes in frame)        |
   500   |   5   | F6F6F6282828010203128745...(2,418 more bytes in frame)        |
   625   |   6   | F6F6F6282828010203E45289...(2,418 more bytes in frame)        |
   750   |   7   | F6F6F6282828010203B45689...(2,418 more bytes in frame)        |
   875   |   8   | F6F6F6282828010203662390...(2,418 more bytes in frame)        |
  1000   |   9   | F6F6F6282828010203C689B2...(2,418 more bytes in frame)        |
  1125   |  10   | F6F6F6282828010203A90128...(2,418 more bytes in frame)        |
  1250   |  11   | F6F6F6282828010203a89800000000000000...(> 1550 0's )          | Loss-of-signal Event
  1375   |  12   | F6F6F6282828010203769208...(2,418 more bytes in frame)        |
  1500   |  13   | 000000000000000000000000...(2,418 more bytes of 0's)          |
  1625   |  14   | 000000000000000000000000...(2,418 more bytes of 0's)          |
  1750   |  15   | 000000000000000000000000...(2,418 more bytes of 0's)          | Receiver Loses Frame
  1875   |  16   | 000000000000000000000000...(2,418 more bytes of 0's)          |
  2000   |  17   | 000000000000000000000000...(2,418 more bytes of 0's)          |
  2125   |  18   | 000000000000000000000000...(2,418 more bytes of 0's)          |
  2250   |  19   | 000000000000000000000000...(2,418 more bytes of 0's)          |
  2375   |  20   | 000000000000000000000000...(2,418 more bytes of 0's)          |
  2500   |  21   | 000000000000000000000000...(2,418 more bytes of 0's)          |
  2625   |  22   | 000000000000000000000000...(2,418 more bytes of 0's)          |
  2750   |  23   | 000000282828010203454C18...(2,418 more bytes in frame)        | Signal Restored
  2875   |  24   | F6F6F6282828010203769208...(2,418 more bytes in frame)        | First Full Frame
  3000   |  25   | F6F6F6282828010203DFB4BA...(2,418 more bytes in frame)        | Second Frame Pattern
  3125   |  26   | F6F6F6282828010203454C18...(2,418 more bytes in frame)        | Frame Sync Restored
```

FIG. 4a

```
Output OC-3 SONET/ STM-1 SDH Signal using The Disclosed Invention in which a substitute
Bit-stream with SONET/SDH framing is placed on the output line.
    0    |   1   | F6F6F6282828010203893BD6...(2,418 more bytes in frame)        | Normal Data Flow
   125   |   2   | F6F6F6282828010203981234...(2,418 more bytes in frame)        |
   250   |   3   | F6F6F6282828010203999345...(2,418 more bytes in frame)        |
   375   |   4   | F6F6F6282828010203A7D378...(2,418 more bytes in frame)        |
   500   |   5   | F6F6F6282828010203128745...(2,418 more bytes in frame)        |
   625   |   6   | F6F6F6282828010203E45289...(2,418 more bytes in frame)        |
   750   |   7   | F6F6F6282828010203B45689...(2,418 more bytes in frame)        |
   875   |   8   | F6F6F6282828010203662390...(2,418 more bytes in frame)        |
  1000   |   9   | F6F6F6282828010203C689B2...(2,418 more bytes in frame)        |
  1125   |  10   | F6F6F6282828010203A90128...(2,418 more bytes in frame)        |
  1250   |  11   | F6F6F6282828010203999999999999999999...(framed Data)          | LOS Selected Bit-stream
  1375   |  12   | 999999F6F6F6282828010203...(2,418 more bytes in frame)        | Receiver Out-of-Frame
  1500   |  13   | 999999F6F6F6282828010203...(2,418 more bytes of 0's)          |
  1625   |  14   | F6F6F6282828010203999999...(2,418 more bytes of 0's)          | Receiver Regains Frame
  1750   |  15   | F6F6F6282828010203999999...(2,418 more bytes of 0's)          | On Substituted Signal
  1875   |  16   | F6F6F6282828010203999999...(2,418 more bytes of 0's)          |
  2000   |  17   | F6F6F6282828010203999999...(2,418 more bytes of 0's)          |
  2125   |  18   | F6F6F6282828010203999999...(2,418 more bytes of 0's)          |
  2250   |  19   | F6F6F6282828010203999999...(2,418 more bytes of 0's)          |
  2375   |  20   | F6F6F6282828010203999999...(2,418 more bytes of 0's)          |
  2500   |  21   | F6F6F6282828010203999999...(2,418 more bytes of 0's)          |
  2625   |  22   | F6F6F6282828010203999999...(2,418 more bytes of 0's)          |
  2750   |  23   | F6F6F6282828028282801020...(2,418 more bytes in frame)        | Signal Restored
  2875   |  24   | 8734BAF6F6F6282828010203...(2,418 more bytes in frame)        | First Full Frame
  3000   |  25   | F6F6F6282828010203DFB4BA...(2,418 more bytes in frame)        | Second Frame Pattern
  3125   |  26   | F6F6F6282828010203454C18...(2,418 more bytes in frame)        | Frame Sync Restored
```

FIG. 4b

BRIDGE TERMINAL OUTPUT UNIT

BACKGROUND OF THE INVENTION

1. Field of the Invention

The bridge terminal output unit operates with a Network Element (NE) used to bridge communications between other NE's that incorporate alarm-based reconfiguration mechanisms and more specifically this invention employs loss-of-signal (LOS) detection to substitute a second bit stream for a time-delayed original bit stream onto an output line to a downstream network terminal.

2. Description of the Related Art

The commercial demand for higher aggregate data rates has led to rapid deployment of new communications technology. Dense Wavelength Division Multiplexed (DWDM) has emerged as the next step in the evolution of high-speed networking. DWDM networks allow the multiplexing of 80 or more 10 GBit/sec data streams onto a single optical fiber. Manufacturers have adopted common standards for channel frequencies and control channel carrier format, and support interfaces to transport most high-speed physical layer protocols including synchronous optical network/synchronous digital hierarchy (SONET/SDH) networks, plesiochronous digital hierarchy (PDH) networks, Gigabit Ethernet, and FDDI-II. An example in the prior art in which DWDM based network is used as a network bridge for the transport of a SONET signal is shown in FIG. 1.

DWDM network deployment has been made practical by several new technologies including optical signal multiplexers, optical signal demultiplexers, optical amplifiers, and optical cross-connects. As implemented on a DWDM network terminal, optical signal multiplexers accept multiple optical signals transmitted on different wavelengths, i.e., channels, of light over separate fibers and combine those signals onto a single fiber. DWDM network optical signal demultiplexers accept multiple optical signals (channels) carried on different wavelengths of light over a single fiber and separates the multiple signals onto separate fibers. Optical amplifiers boost the power levels of the multiplexed channels simultaneously, extending the transmission range of DWDM terminals to a practical and useful distance. Optical cross-connects dynamically re-provision DWDM channels. Currently, most DWDM networks are used to consolidate and bridge communications between SONET/SDH, PDH, and other legacy networks.

SONET and SDH constitute the majority of deployed single-channel, wide-area optical communications networks. SONET and SDH provide open physical layer transmission standards for manufacturers of optical network transmission equipment. SONET/SDH defines standard optical signals; a synchronous frame structure for multiplexed digital traffic; bit timing and network element synchronization; alarm thresholds and error recovery; and standard operations, administration, maintenance, and provisioning. DWDM terminals interface with most high-speed communications terminals, such as SONET/SDH and PDH, via optical line input-output units (OLIU). The input to the DWDM terminal is a functional unit that accepts an incoming single-channel optical data stream from the network being bridged, converts it to an electrical binary data stream, retransmits that binary stream as an optical signal at a specific wavelength suitable for optical multiplexing, and presents that signal to the optical multiplexing unit. The output of the DWDM terminal is a functional unit that performs the reverse operation: it accepts an individual wavelength from the multiplexed optical stream, converts the electrical stream to an optical stream suitable for reception by the single channel network being bridged.

Off-the-shelf DWDM terminals are available that interface with some high-speed communications terminals using all-optical inputs and outputs. In this case, the communications terminal of the network being bridged is responsible for generating an optical signal at the proper wavelength and line width suitable for optical multiplexing. The input to the DWDM terminal is a functional unit that accepts an incoming single-channel optical data stream and delivers it directly to the optical multiplexing unit. The output of the DWDM terminal is a functional unit that performs the reverse operation: it accepts an individual wavelength from the multiplexed optical stream, and presents it directly to the connected high-speed communications terminal.

Present DWDM terminals and cross-connects do not operate in a maimer that is transparent to the automatic protection switch (APS) mechanisms of the network being bridged. The APS mechanisms of the networks being bridged, such as SONET/SDH and PDH terminals, must be disabled before DWDM-layer APS or cross-connects occur. If the line between the DWDM-layer terminal and the network being bridged should fail, the bridged network will be unable to automatically restore service. This loss of APS functionality in the bridged network serves to degrade overall network performance.

BRIEF SUMMARY OF THE INVENTION

The commercial demand for higher aggregate data rates has led to DWDM (Dense Wavelength Division Multiplexed) transmissions. Network elements need the capacity in these systems to reconfigure in case of a bit stream failure. The instant invention can bridge communications between other network elements including optical and electrical signal network elements, when a loss of signal detection circuit to substitute a second bit stream for a time delayed original bit stream and a circuit element connected to the loss of signal detection circuit to permit the network elements to reconfigure without activating automatic protect switch mechanisms of a bridged network. The instant invention also teaches a method for ensuring communication of network elements of a bridged network including optical and electrical signal network elements, by detecting a loss of signal in a transmitted bit stream; substituting a second bit stream for a time delayed original bit stream; and allowing network elements to crossconnect to reconfigure optical channels in a manner that will not interfere with network functions.

The object of this invention is provide an improved network bridge that permits the transparent transport of data across a bridge network without the necessity of disabling an automatic protect switch mechanism which is normally activated by a failure in a bit stream being transmitted.

Another object of the invention is an improved network bridge interface which masks failure conditions that would improperly automatically trip a protect switch.

These and other objects of the invention are accomplished by the bridge terminal output device.

Advantages of the instant invention are that it enables Present Dense Wavelength Division Multiplexed (DWDM) terminals and cross-connects to operate in a manner that is transparent to the APS mechanisms of the network being bridged. The APS mechanisms of the network terminals being bridged, such as SONET/SDH and PDH terminals, in conventional systems must be disabled before DWDM-layer APS or cross-connects occur. If the line between the DWDM terminal and the network being bridged should fail, the bridged network will be unable to automatically restore service. This loss of APS functionality in the bridged network serves to degrade overall network performance. The advantage of the current invention is to prevent loss of APS functionality in the bridged network and to prevent degrading of overall network performance.

Another advantage of the invention is that it eliminates service outages that occur when race conditions between APS mechanisms of bridged NE's such as SONET/SDH and PDH, compete with the APS mechanisms and cross-connect mechanisms of the NE used as the communications bridge.

BRIEF DESCRIPTION OF THE DRAWINGS

FIG. 3a shows a SONET/SDH data stream with a bit-pattern which would trigger the automatic protect switch.

FIG. 3b shows a SONET/SDH data stream produced by the substitute bit stream.

FIG. 4a shows a SONET/SDH data stream with a bit pattern which would trigger the automatic protect switch.

FIG. 4b shows a SONET/SDH data stream produced by the substitute bit stream.

DETAILED DESCRIPTION OF THE INVENTION

Figure 1:
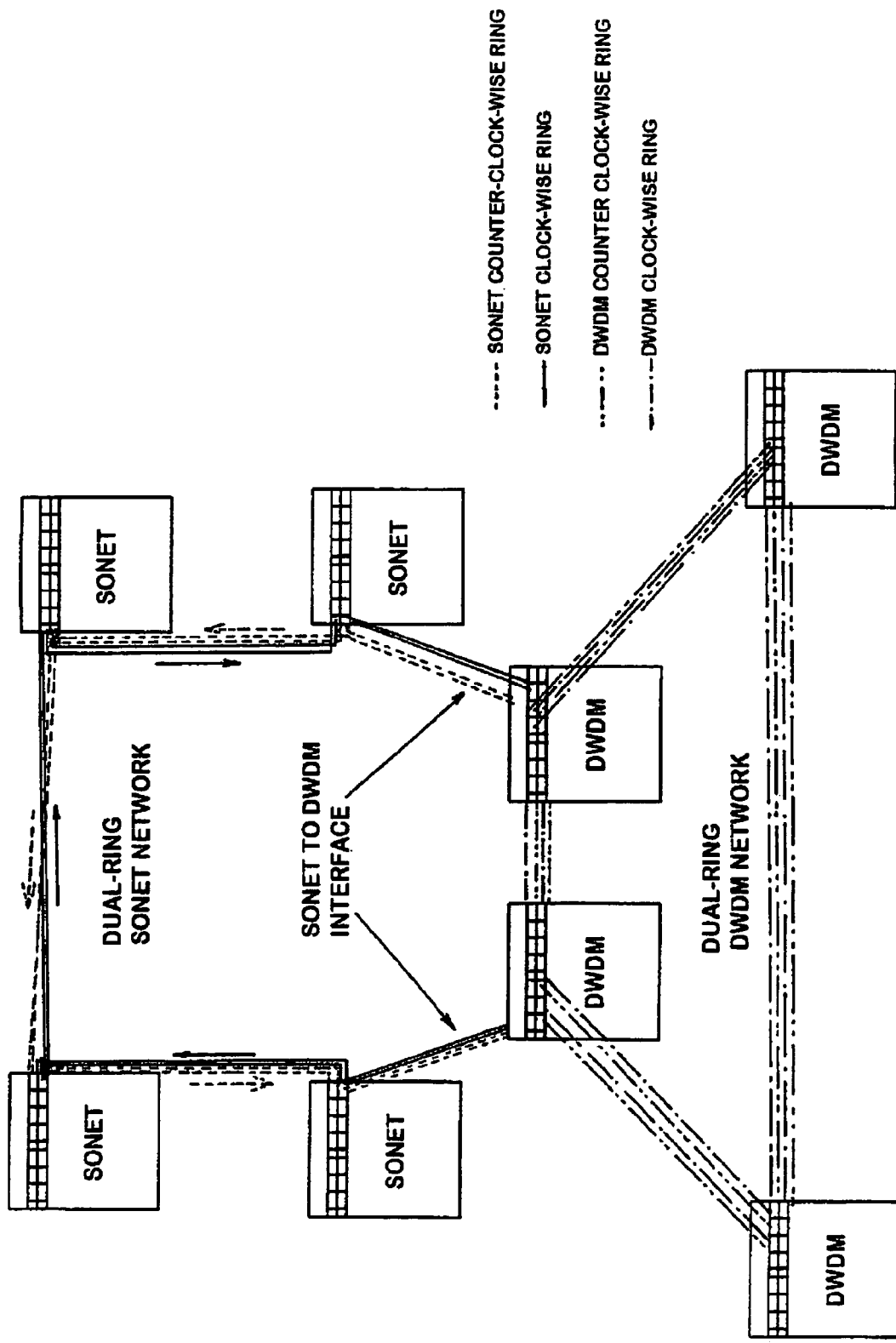
FIG. 1 shows an example in which a dense wavelength division multiplexed (DWDM) based network is used as a network bridge for the transport of a synchronous optical network (SONET) signal in the prior art.

The commercial demand for higher aggregate data rates has led to rapid deployment of new communications technology. DWDM has emerged as the next step in the evolution of high-speed networking. DWDM networks allow the multiplexing of 80 or more 10 GBit/sec data streams onto a single fiber. Vendors have adopted common standards for channel frequencies and control channel carrier format. Vendors support interfaces to transport most high-speed physical layer protocols including SONET/SDH, PDH, Gigabit Ethernet, and FDDI-II. An example in which a DWDM based network is used as a network bridge for the transport of a SONET signal is given in FIG. 1.

This invention that employs Loss-of-Signal (LOS) detection to substitute a second bit stream for a time-delayed original bit stream onto an output line to a downstream network terminal. When the physical-layer bit stream from a Network Terminal is bridged over a second, underlying physical layer network, this invention allows the underlying network to reconfigure without activating the Automatic Protect Switch (APS) mechanisms of the bridged network.

This invention allows DWDM Network Elements to perform DWDM-layer APS and DWDM-layer cross-connects to reconfigure optical channels in a manner that will not interfere with the APS mechanisms of the network bridged across the DWDM network. Here "interfere" means to cause an inadvertent Automatic Protect Switch on the equipment bridged over the DWDM network.

The method of the invention could be employed on a digital data transmission system that uses wavelength division multiplexing to place more than one channel of data on a single fiber.

Some configurations of the invention are as follows:
a. Two or more DWDM network Terminals, each employing the following functional blocks:

1. One or more terminal input/output unit(s). On input, this unit: accepts either an optically encoded digital data stream on an optical fiber or an electrically encoded data stream on copper cable; converts that encoded stream to a binary data stream suitable for transmission on a DWDM network; and encodes and transmits the bit stream using optical encoding, such as NRZ (Non-Return to Zero) or RZ (Return to Zero) encoding, on a carrier suitable for optical multiplexing. On output, this unit: accepts the optically encoded bit stream from a carrier suitable for optical demultiplexing; converts the encoded bit stream into a clocked bit stream compatible with the original input signal; detects and indicates Loss-of-Signal using criteria such as the presence of a predetermined number of consecutive logical zeroes in the binary data stream, the absence of a recovered clock signal for a predetermined interval of time, or the absence of optical power sufficient to detect data for a predetermined interval of time; resets Loss-of-Signal after declaration based on criteria such as the presence of a predetermined number of consecutive logical transitions in the binary data stream, the presence of a recovered clock signal for a predetermined interval of time, or on the presence of optical power sufficient to detect data for a predetermined amount of time; buffers and applies a constant delay to the recovered bit stream using a clocked First-in First-out (FIFO) memory with storage equal to the number of bits required to declare Loss-of-Signal; generates, using an internal clock operating at the same rate as the recovered clock, a substitute bit stream that, depending on the reconfiguration time of the DWDM network, may or may not duplicate the frame structure of the original input signal; selects either the recovered bit stream or the substitute bit stream based on the state of the Loss-of-Signal indicator; and encodes the selected binary bit stream in a format compatible with the encoded input signal.

2. One or more optical signal multiplexers that accept multiple optical signals transmitted on different wavelengths, i.e. channels, of light over separate fibers and combine those signals onto a single fiber.

3. One or more optical signal demultiplexers that accept multiple optical signals (channels) carried on different wavelengths of light over a single fiber and separates the multiple signals onto separate fibers.

4. Zero or more DWDM-layer Automatic Protect Switch units that detect failure conditions of the incoming and outgoing DWDM optical signals and select alternate physical paths based on the failure criteria. Examples of failure are Loss-of-Signal (LOS), Far-End-Receive-Failure (FERF), and high Bit-Error-Rate (BER).

5. Zero or more DWDM-layer error monitoring units that detect failure conditions of the incoming and outgoing DWDM optical signals and of internal components (such as lasers, detectors, analog and digital electronics, and amplifiers) and select alternate transmission components based on the failure criteria.

b. Zero or more optical amplifiers that are used to boost the power levels of the multiplexed channels simultaneously.

c. One or more DWDM optical cross-connects that can change the channel provisioning of the DWDM network.

This invention is effective in eliminating service outages that occur when race conditions between the APS mechanisms of bridged NE's, such as SONET/SDH and PDH, compete with the APS mechanisms and cross-connect mechanisms of the NE used as the communications bridge.

A preferred embodiment as detailed in this disclosure will prevent the APS mechanisms of NE's, including SONET/SDH and PDH terminals, from being triggered by DWDM-layer network reconfiguration. The format of the substitute bit stream generator is in part determined by the time required to reconfigure the DWDM-layer.

DWDM network deployment has been made practical by several new technologies including optical signal multiplexers, optical signal demultiplexers, optical amplifiers, and optical cross-connects. As implemented on a DWDM network terminal, optical signal multiplexers accept multiple optical signals transmitted on different wavelengths, i.e. channels, of light over separate fibers and combine those signals onto a single fiber. DWDM network optical signal demultiplexers accept multiple optical signals (channels) carried on different wavelengths of light over a single fiber and separates the multiple signals onto separate fibers. Optical amplifiers boost the power levels of the multiplexed channels simultaneously, extending the transmission range of DWDM terminals to a practical and useful distance. Optical cross-connects dynamically re-provision DWDM channels. Currently, most DWDM networks are used to consolidate and bridge communications between SONET/SDH, PDH, and other legacy networks.

SONET and SDH constitute the majority of deployed single-channel, wide-area optical communications networks. SONET and SDH provide open physical layer transmission standards for manufacturers of optical network transmission equipment. SONET/SDH defines standard optical signals; a synchronous frame structure for multiplexed digital traffic; bit timing and network element synchronization; alarms thresholds and error recovery; and standard operations, administration, maintenance, and provisioning.

DWDM terminals interface with most high-speed communications terminals, such as SONET/SDH and PDH, via Optical Line Input-Output Units (OLIU). The input to the DWDM terminal-is a functional unit that accepts an incoming single-channel-optical data stream from the network being bridged, converts it to an electrical binary data stream, retransmits that binary stream as an optical signal at a specific wavelength suitable for optical multiplexing, and presents that signal to the optical multiplexing unit. The output of the DWDM terminal is a functional unit that performs the reverse operation: it accepts an individual wavelength from the multiplexed optical stream, converts that signal to an electrical binary data stream, and converts the electrical stream to an optical signal suitable for reception by the single channel network being bridged.

Off-the-shelf DWDM terminals are available that interface with some high-speed communications terminals using all-optical inputs and outputs. In this case, the communications terminal of the network being bridged is responsible for generating an optical signal at the proper wavelength and line width suitable for optical multiplexing. The input to the DWDM terminal is a functional unit that accepts an incoming single-channel optical data stream and delivers it directly to the optical multiplexing unit. The output of the DWDM terminal is a functional unit that performs the reverse operation: it accepts an individual wavelength from the multiplexed optical stream, and presents it directly to the connected high-speed communications terminal. The invention being disclosed here applies to such an interface, but must be implemented using optical components in place of the Loss-of-Signal based arbitration circuit that operates on the electrical domain bit stream as described in the preferred embodiment as described.

Present Dense Wavelength Division Multiplexed (DWDM) terminals and cross-connects do not operate in a manner that is transparent to the APS mechanisms of the network being bridged. The APS mechanisms of the network terminals being bridged, such as SONET/SDH and PDH terminals, must be disabled before DWDM-layer APS or cross-connects occur. If the line between the DWDM terminal and the network being bridged should fail, the bridged network will be unable to automatically restore service. This loss of APS functionality in the bridged network serves to degrade overall network performance.

Figure 2:
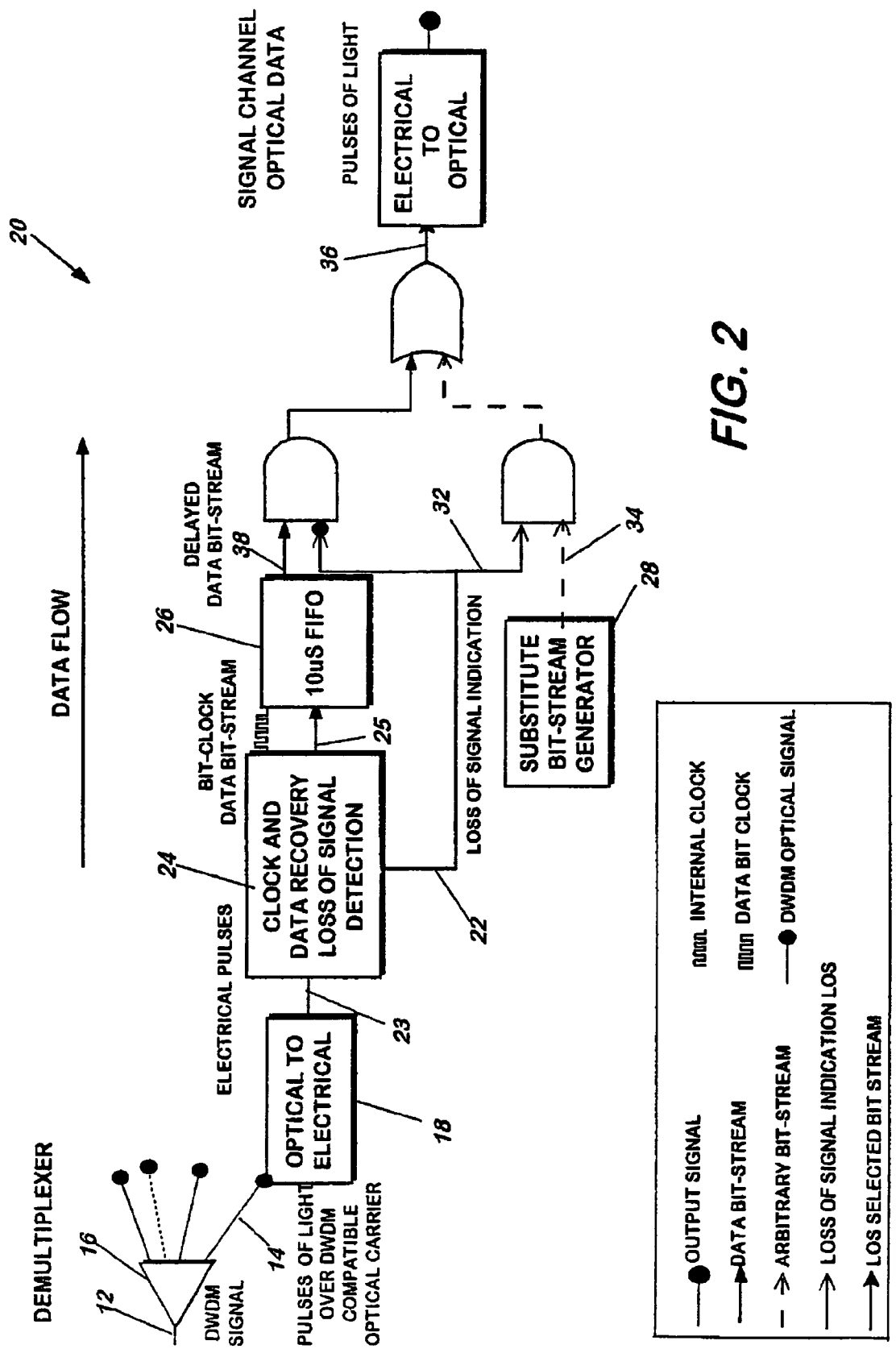
FIG. 2 shows a bridge terminal output device indicating bit stream selection logic.

The invention disclosed here in FIG. 2 is incorporated into the output unit of a network terminal used to bridge communications networks. An example, and a leading candidate for use of this invention, is the output unit of a DWDM network terminal used to interface with a SONET/SDH network terminal.

The invention disclosed here monitors a bit stream for anomalies that would trigger the Automatic Protect Switch mechanisms of a network being bridged; generates, based on this monitor function, a logical signal to indicate the presence or absence of anomalies in the input bit stream; buffers the input bit stream using a first-in first-out (FIFO) memory with storage equal to the time interval required to set the anomaly indicator; generates at the same data rate as the input signal a substitute bit stream that is free of the anomalies that would trigger the APS mechanisms of the network being bridged; uses the anomaly indicator to select either the delayed input bit stream or the substitute bit stream; and outputs the selected bit stream to the network being bridged. Most network protocols, such as SONET/SDH and PDH, define conditions which will trigger APS mechanisms. Typically, Loss-of-Signal is the condition that must be monitored in an embodiment of this invention.

The bridge terminal output unit as implemented in the preferred embodiment (FIG. 2) accepts the optically encoded bit stream from a carrier suitable for optical demultiplexing; converts the encoded bit stream into a clocked electrical bit stream compatible with the original input signal; generates Loss-of-Signal based on the presence of a predetermined number of consecutive logical zeroes in the binary data stream or on the absence of a recovered clock signal for a predetermined interval of time; resets Loss-of-Signal after declaration based on the presence of a predetermined number of consecutive logical transitions in the binary data stream or on the presence of a recovered clock signal for a predetermined interval of time; buffers and applies a constant delay to the recovered bit stream using a clocked first-in first-out (FIFO) memory with storage equal to the number of bits required to declare Loss-of-Signal; generates a substitute bit stream, with or without framing to duplicate that of the original input signal depending on the reconfiguration time of the DWDM network, using an internal clock operating at the same rate as the recovered clock; selects either the recovered bit stream or the substitute bit stream based on the state of the Loss-of-Signal indicator; and encodes the selected binary bit stream in a format compatible with the encoded input signal.

The format of the bit pattern generated by the substitute bit stream generator is dependent on the maximum reconfiguration time of the bridging network. It is assumed that the bit stream being bridged is unavailable during reconfiguration.

The specifications for SONET/SDH and most PDH equipment require that a LOS defect be declared upon observing 55+45 microseconds of an all zeroes pattern. This wide range was required to satisfy different vendors of SONET/SDH and PDH equipment; the exact value is determined by the manufacturer. The LOS defect is cleared when a valid SONET/SDH framing word is detected and the associated frame is clear of new LOS defects.

The criteria to be used in the preferred embodiment for anomaly detection is 10 microseconds of an all zeroes-pattern. The depth of the FIFO must be sufficient to buffer 10 microseconds of data. The criteria used to reset the anomaly indicator is recommended to be a 10 microsecond period that contains transitions between zeroes and ones patterns. Alternate anomaly reset criteria such as the presence of a protocol-specific framing patterns, such as SONET/SDH $F628_{16}$ framing pattern, could be used if the embodiment is customized to a specific protocol. This latter criteria has the disadvantage of masking network failures that produce illegitimate bit streams from the bridged network for an extended period of time.

The format of the bit stream produced by the substitute bit stream generator is governed by both alarm mechanisms defined for the network being bridged and for the time required to reconfigure the bridging network. The alarm mechanisms as defined for SONET/SDH that drive the format of the substitute bit stream are discussed next. The alarm mechanisms discussed here apply to PDH equipment from many, but not all, vendors.

A severely errored frame (SEF) event is declared when the SONET/SDH Network Terminal fails to detect a valid frame alignment pattern (carried in transport overhead bytes A1 and A2) for four consecutive frames. The A1A2 pattern is equal to $F628_{16}$. SEF ends when two valid successive frames are received with error-free framing patterns. This implies that SONET requires 500 microseconds to declare loss of frame and 250 microseconds to re-acquire frame sync. A Loss of Frame (LOF) defect is declared when the SEF condition persists for 3 milliseconds. If the time interval required to reconfigure the bridging network is more than approximately 2.75 milliseconds, the substitute bit stream generated must contain valid SONET/SDH framing. The receiving SONET/SDH terminal will then reset LOF and SEF conditions and will not initiate an APS action based on the LOF condition.

Line Alarm Indication Signal (AIS) and Far-End Receive Failure are generated signals carried in the SONET overhead K2 byte, which conveys detected failures to other terminals on the network. AIS and FERF prevent downstream equipment from generating unnecessary alarms and allow orderwire and data communications channels (DCC) to continue to be used between properly functioning equipment. Line AIS is generated and transmitted to downstream equipment upon LOS or LOF error declaration on the incoming signal. Line AIS is transmitted as bits 6–8 of K2 set to $111_2$. FERF is returned by the downstream equipment as bits 6–8 of K2 set to $110_2$ upon its successful detection of AIS. Five frames are required to set the Line AIS defect and to acknowledge a returned FERF.

The substitute bit stream generated must avoid using bit patterns that would be interpreted as AIS and FERF error conditions. If SONET/SDH framing is required in the substitute bit stream, values must be set in the transport overhead section as to not initiate APS actions based on received values. A value of $000_2$ in most overhead positions is appropriate. Other values should be filled in to indicate that the SONET/SDH frame is unequipped.

SONET/SDH Network Terminals and most PDH Network Terminals will perform a protection switch if a hard bit error is detected. A hard bit error is declared if a bit error rate worse than $10^{-3}$ or $10^{-4}$ (set by manufacturer) is experienced for a period exceeding 8 milliseconds. SONET/SDH Network Terminals and most PDH Network Terminals will also perform a protection switch if a soft bit error is experienced. A soft bit error is declared if the bit error rate is worse than an operator selectable value that must be between $10^{-5}$ to $10^{-9}$. The bit error rate is computed from the Bit Interleaved Parity (BIP) carried as a field within the SONET/SDH or PDH frame. Frames, such as SONET/SDH or PDH, from the substitute bit stream generator must contain valid values for BIP. The bridged network will not initiate an APS switch based on hard or soft bit error rate thresholds being exceeded as the received frames will not be in error.

To summarize, the preferred embodiment utilizes a substitute bit stream generator that produces a signal that will not initiate an APS action on the part of the network being bridged. This bit stream is substituted for the time-delayed original bit stream upon detection of a condition in the original bit stream that would cause the bridged network to initiate an APS action. The format of this generated bit stream depends on the length of time required to reconfigure the bridge network, such as would occur during a bridging APS action or cross-connect during which the bridged bit stream is unavailable to the bridged network. A generator that produces substitute frames compatible with the bridged network will satisfy conditions to prevent the bridged network from initiating an APS action.

D. Advantages of New Features

This invention allows a bridge network, such as a DWDM network, to be reconfigured without causing the bridged network, such as a SONET/SDH or PDH network, from initiating an APS action. This allows for the transparent transport of a bit stream across a bridge network.

At present, either the reconfiguration capabilities of the bridge network or the APS mechanisms of the network being bridged are disabled. This reduces overall network survivability. Typically, the APS mechanisms of the bridged network are disabled. Using a DWDM bridge transporting SONET/SDH data as an example, if the link between the DWDM terminal and the SONET/SDH terminal should fail, the network will not be able to automatically restore service.

E. Alternatives

Alternate approaches include utilizing mechanisms that shorten the reconfiguration time of bridge networks to less than the minimum interval in which the bridged network initiates an APS action. As required by the SONET/SDH specifications and most PDH network terminals, this interval in which the bridged signal is unavailable must be less than 10 microseconds. Electronic and optical switching components that operate within these parameters are available. The practical incorporation of these devices into bridge NE to reduce system-wide reconfiguration times to the interval required to prevent the bridged NE from initiating an APS action would provide a real alternative to the invention disclosed here.

This invention is incorporated into a network element (NE) used to bridge communications between other NE's that incorporate alarm-based reconfiguration mechanisms and is effective in eliminating service outages that occur when race conditions between an automatic protection switch (APS) mechanisms of bridged NE. An example of such bridging is the use of dense wavelength division multiplexed (DWDM) networks to bridge communications between a synchronous optical network/synchronous digital hierarchy (SONET/SDH) networks. This device is incorporated into the DWDM NE's optical output unit that is used to interface with non-DWDM NE's; allowing the DWDM-layer reconfiguration to occur without triggering the automatic protection switch (APS) mechanisms in the NE's which are interfaced to the DWDM NE. With present-generation DWDM network terminals not incorporating this device, the APS mechanisms of the NE's interfaced to the DWDM network, such as SONET/SDH and plesichronous digital hierarchy (PDH) network terminals, must be disabled before DWDM-layer APS or cross-connections are performed. This loss of SONET/SDH and PDH APS functionality serves to degrade overall network performance.

This device employs loss-of-signal (LOS) detection to substitute a second bit stream for a time-delayed original bit stream onto an output line to a downstream network terminal. When the physical-layer bit stream from a network terminal is bridged over a second, underlying physical layer network, this device allows the underlying network to reconfigure without activating the automatic protect switch (APS) mechanisms of the bridged network.

This device allows DWDM network elements to perform DWDM-layer APS and DWDM-layer cross-connects to reconfigure optical channels in a manner that will not interfere with the APS mechanisms of the network bridged across the DWDM network. Here "interference" means to cause an inadvertent automatic protect switch on the equipment bridged over the DWDM network.

The method used in this device may be employed on a digital data transmission system that uses wavelength division multiplexing to place more than one channel of data on a single fiber and must be implemented using optical components in place of the loss-of-signal base arbitration circuit that operates on an electrical domain bit stream as described above.

In it preferred embodiment, the bridge terminal output device 20, as shown in FIG. 2, will prevent the APS mechanism's of NE's, including the SONET/SDH and PDH terminals, from being triggered by DWDM-layer network reconfiguration. The bridge terminal output device 20 accepts an optically encoded bit stream 14 from a carrier 12 suitable for optical demultiplexing in a demultiplexer 16; converts the encoded bit stream 14 into an electrical bit stream 23 in an optical-to-electrical photodetector 18, or similar device. The electrical bit stream 23 is then converted into a clocked electrical bit stream 25 in a clock and data recovery loss of signal detection module 24 that is compatible with the original input signal 14. Also generated within the clock and data recovery loss of signal detection module 24 is a loss-of-signal indication 22 based on the presence of a predetermined number of consecutive logical zeros in the binary data stream or on the absence of a recovered clock signal for a predetermined interval of time. The loss-of-signal 22 is reset after declaration based on the presence of a predetermined number of consecutive logical transitions in the binary data stream 25 or in the presence of a recovered clock signal for a predetermined interval of time. The signal 25 is applied to a clocked first-in first-out (FIFO) memory 26 with a storage capacity equal to the number of bits required to declare loss-of-signal. In a substitute bit stream generator 28 a substitute bit stream 34 is generated with or without framing to duplicate that of the original input signal 14 depending on the reconfiguration time of the DWDM network, using an internal clock operating at the same rate as the recovered clock 24. The format of the substitute bit stream generator 28 is, in part determined by the time required to reconfigure the DWDM-layer. Either the delayed bit stream 38 or the substitute bit stream 34 is selected based on the state of the loss-of-signal (LOS) indicator 22. The selected binary bit stream is then encoded in a format compatible with the encoded input signal 14.

The format of the bit pattern 34 generated by the substitute bit stream generator 28 is dependent on the maximum reconfiguration time of the bridging network. It may be assumed that the bit stream being bridged 23 is unavailable during reconfiguration.

The specifications for SONET/SDH and most PDH equipment require that a LOS defect be declared upon observing 55±45 microseconds of an all zeros pattern. This wide range was required to satisfy different vendors of the SONET/SDH and the PDH equipment. The exact value is determined by the manufacturer. The LOS defect is cleared when a valid SONET/SDH framing word is detected and the associated frame is clear of new LOS defects.

The criteria to be used in this embodiment of the bridging terminal device 20 for anomaly detection is 10 microseconds of an all zeros-pattern. The depth of the FIFO 26 must be sufficient to buffer 10 microseconds of data. The criteria used to reset the anomaly indicator is recommended to be a 10 microsecond period that contains transitions between zeros and ones patterns. Alternate anomaly reset criteria such as the presence of a protocol-specific framing patterns, such as SONET/SDH $F628_{16}$ framing pattern, could be used if the embodiment is customized to a specific protocol. This latter criteria has the disadvantage of masking network failures that produce illegitimate bit streams from the bridged network for an extended period of time.

The format of the bit stream 34 produced by the substitute bit stream generator 28 is governed by both alarm mechanisms defined for the network being bridged and for the time required to reconfigure the bridging network. The alarm mechanisms as defined for SONET/SDH that drive the format of the substitute bit stream 34 are discussed below. The alarm mechanisms discussed here appy to PDH equipment from many, but not all vendors.

A severely errored frame (SEF) event is declared when the SONET/SDH network terminal fails to detect a valid frame alignment pattern (carried in transport overhead bytes A1 and A2) for four consecutive frames. The A1A2 pattern is equal to $F628_{16}$. SEF ends when two valid successive frames are received with error-free framing patterns. This implies that SONET requires 500 microseconds to declare loss of frame and 250 microseconds to re-acquire frame synchronization. A loss of frame (LOF) defect is declared when the SEF condition persists for 3 milliseconds. If the time interval required to reconfigure the bridging network is more than approximately 2.75 milliseconds, the substitute bit stream 34 generated must contain valid SONET/SDH framing. The receiving SONET/SDH terminal will then reset LOF and SEF conditions and will not initiate an APS action based on the LOF condition.

Line alarm indication signal (AIS) and far-end receive failure (FERF) are generated signals carried in the SONET overhead K2 byte, which conveys detected failures to other terminals on the network. AIS and FERF prevent downstream equipment from generating unnecessary alarms and allow orderwire and data communications channels (DCC) to continue to be used between properly functioning equipment. Line AIS is generated and transmitted to downstream equipment upon LOS or LOF error declaration on the incoming signal. Line AIS is transmitted as bits 6–8 of K2 set to $111_2$. FERF is returned by the downstream equipment as bits 6–8 of K2 set to $110_2$ upon its successful detection of AIS. Five frames are required to set the Line AIS defect and to acknowledge a returned FERF.

The substitute bit stream 34 generated must avoid using bit patterns that would be interpreted as AIS and FERF error conditions. If SONET/SDH framing is required in the substitute bit stream 34, values must be set in the transport overhead section as to not initiate APS actions based on received values. A value of $000_2$ in most overhead positions is appropriate. Other values should be filled in to indicate that the SONET/SDH frame is unequipped.

SONET/SDH network terminals and most PDH network terminals will perform a protection switch if a hard bit error is detected. A hard bit error is declared if a bit error rate worse than $10^{-3}$ or $10^{-4}$ (set by manufacturer) is experienced for a period exceeding 8 milliseconds. SONET/SDH network terminals and most PDH network terminals will also perform a protection switch if a soft bit error is experienced. A soft bit error is declared if the bit error rate is a worse than an operator selectable value that must be between $10^{-5}$ to $10^{-9}$. The bit error rate is computed from the bit interleaved parity (BIP) carried as a field within the SONET/SDH or PDH frame. Frames, such as SONET/SDH or PDH, from the substitute bit stream generator 28 must contain valid values for BIP. The bridged network will not initiate an IPS switch based on hard or soft bit error rate thresholds being exceeded as the received framws will not be in error.

In summary, the preferred embodiment utilizes a substitute bit stream generator 28 that produces a signal 34 that will not initiate as APS action on the part of the network being bridged. This bit stream 34 is substituted for the time-delayed original bit stream 38 upon detection of a condition in the original bit stream 23 that would cause the bridged network to initiate an APS action. The format of this generated bit stream 34 depends on the length of time required to reconfigure the bridge connect during which the bridged bit stream 23 is unavailable to the bridged network. A generator 28 that produces substitute frames compatible with the bridged network will satisfy conditions to prevent the bridged network from initiating an APS action.

This invention allows a bridge network, such as a DWDM network, to be reconfigured without causing the bridged network, such as a SONET/SDH or PDH network, from initiating an APS action. Here the transport of a bit stream across a bridge network is allowed.

At present, either the reconfiguration capabilities of the bridge network or the APS mechanisms of the network being bridged are disabled. This reduces overall network survivability. Typically, the APS mechanisms of the bridged network are disabled. This reduces overall network survivability. Typically, the APS mechanisms of the bridged network are disabled. Using a DWDM bridge transporting SONET/SDH data as an example, if the link between the DWDM terminal and the SONET/SDH terminal should fail, the network will not be able to automatically restore service.

An alternate approach would include utilizing mechanisms that shorten the reconfiguration time of bridge networks to less than the minimum interval in which the bridged network initiates an APS action. As required by the SONET/SDH sspecifications and most PDH network terminals, this interval in which the bridged signal is unavailable must be less than 10 microseconds. Electronic and optical switching components that operate within these parameters are available. The practical incorporation of these devices into bridge NE to reduce system-wide reconfiguration times to the interval required to prevent the bridged NE from initiating an APS action provides a real alternative to the invention disclosed herein.

FIG. 3(a) depicts a SONET/SDH data stream with a bit pattern in frame number 11 which would trigger the automatic protect switch mechanism in the receiving Network Element. The triggering bit-pattern is short in duration and is declared as a SONET/SDH LOS defect. FIG. 3(b) depicts the SONET/SDH bit-stream as is output using the invention. The bit-pattern in frame number 11 is replaced by a bit-pattern that does not trigger the automatic protect mechanism in the receiving network element.

FIG. 4(a) depicts a SONET/SDH data stream with a bit-pattern in frame number 11 which would trigger the automatic protect switch mechanism in the receiving Network Element. The triggering bit-pattern is long in duration and is declared first as a SONET/SDH LOS defect and, after frame 15, as a LOF defect. FIG. 4(b) depicts the SONET/SDH bit stream as is output using the disclosed invention. The bit-pattern in frame number 11 is replaced by a bit-pattern which contains proper SONET/SDH framing. This substituted bit-pattern is not declared as a SONET/SDH LOS defect, and thus does not trigger the automatic protect mechanism in the receiving network element.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed is:

1. A method of masking failure conditions that would automatically trip a failure protect switch in a bridge network bridged across a DWDM network, said method comprising:

accepting a binary encoded data bit stream from a carrier suitable for optical multiplexing;

converting the binary encoded data bit stream into a recovered clocked bit stream compatible with an original input signal;

detecting and indicating loss-of-signal using predetermined criteria;

resetting a loss-of-signal indicator after declaration based on predetermined criteria;

buffering and applying a constant delay to the recovered bit stream using a clocked first-in first out (FIFO) memory with storage equal to the number of bits required to declare loss-of-signal;

generating a substitute bit stream utilizing an internal clock operating at a same rate as the recovered bit stream, wherein the substitute bit stream, depending upon a reconfiguration time of the DWDM network, duplicates a frame structure of the original input signal;

selecting either the recovered bit stream or the substitute bit stream based on the state of the loss-of-signal indicator according to predetermined criteria; and encoding the selected binary bit stream in a format compatible with the encoded input signal.

* * * * *